United States Patent

[11] 3,545,703

| [72] | Inventors | Jerry Doniger Montvale;<br>Joseph F. McLaughlin, Boonton, New Jersey |
|---|---|---|
| [21] | Appl. No. | 679,757 |
| [22] | Filed | Nov. 1, 1967 |
| [45] | Patented | Dec. 8, 1970 |
| [73] | Assignee | The Bendix Corporation<br>a corporation of Delaware |

[54] SYSTEM FOR CONTROLLING FLIGHT OF AIRCRAFT TO ATTAIN A PREDETERMINED ALTITUDE
6 Claims, 3 Drawing Figs.

| [52] | U.S. Cl. | 244/77 |
|---|---|---|
| [51] | Int. Cl. | G01c 21/00 |
| [50] | Field of Search | 244/77(A), 77(D) |

[56] References Cited
UNITED STATES PATENTS

| 3,105,660 | 10/1963 | Lenefsky et al. | 244/77(D)UX |
|---|---|---|---|
| 3,240,446 | 3/1966 | Miller | 244/77(A)UX |

*Primary Examiner*—Robert F. Stahl
*Attorneys*—Anthony F. Cuoco and Plante, Hartz, Smith and Thompson

ABSTRACT: A system for controlling an aircraft to follow a programed flight path from its present altitude to a predetermined altitude over an aim point. The craft is controlled in response to altitude signals, altitude command signals, altitude rate signals and altitude rate command signals for first capturing and then following the predetermined flight path, and controlled in response to altitude signals and altitude rate signals for first capturing the predetermined altitude and then leveling at said altitude.

INVENTORS
JOSEPH F. MCLAUGHLIN
JERRY DONIGER
BY Anthony J. Cuseo
ATTORNEY

SYSTEM FOR CONTROLLING FLIGHT OF AIRCRAFT TO ATTAIN A PREDETERMINED ALTITUDE

BACKGROUND OF THE INVENTION

1. Field of the Invention

This invention relates to aircraft control systems and, more particularly, to systems for controlling the vertical flight of an aircraft so that the craft is at a predetermined altitude when over an aimpoint.

2. Description of the Prior Art

While automatic flight control systems have been for many years tied into horizontal navigation systems (VOR, TACAN), no similar tie in to vertical navigation systems has been effectively accomplished. The principal reason for this has been the unavailability of accurate onboard sensing equipment to provide data for making the required calculations. Prior to the present invention, vertical flight maneuvers were performed manually. Once the pilot left his present altitude, the altitude of the craft was an integral function of vertical speed. Since most vertical speed systems are relatively inaccurate, large errors occurred after several minutes of integration. In order to avoid these errors the pilot had to redetermine his original maneuver many times during the flight. Modern high speed aircraft have the necessary onboard equipment to provide date with the required accuracy and whereby the device of the present invention may be effectively used.

SUMMARY OF THE INVENTION

A system for controlling an aircraft to follow a programmed flight path from its present altitude to a predetermined altitude over an aimpoint. An altitude command signal is provided as a function of the distance to the aimpoint and an altitude rate command signal is provided as a function of the ground speed of the craft. An altitude rate error signal is provided in response to the altitude rate command signal and an actual altitude rate signal. The aircraft is controlled in response to the altitude command signal, the altitude rate error signal, and signal corresponding to the altitude of the craft above the aimpoint for first capturing and then tracking the flight path, and controlled in response to the altitude rate signal and the signal corresponding to the altitude of the aircraft above the aimpoint for first capturing the predetermined altitude and then leveling at said altitude.

One object of this invention is to control an aircraft for first capturing a programmed vertical flight path and then for tracking the flight path to a predetermined altitude.

Another object of this invention is to control an aircraft for first capturing a predetermined altitude and then leveling at said altitude.

Another object of this invention is to control an aircraft to fly at a predetermined angle from its present altitude to a predetermined altitude.

Another object of this invention is to control an aircraft to fly at a predetermined angle from its present altitude to a predetermined altitude so that the craft performs satisfactorily at maximum speed and maximum angle and at minimum speed and minimum angle.

Another object of this invention is to control an aircraft for capturing a predetermined vertical flight path including means for assuring that the craft will not overshoot the flight path.

Another object of this invention is to control an aircraft to track a predetermined vertical flight path including means for assuring that the craft will not fly a path parallel to the predetermined path because of prevailing winds.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
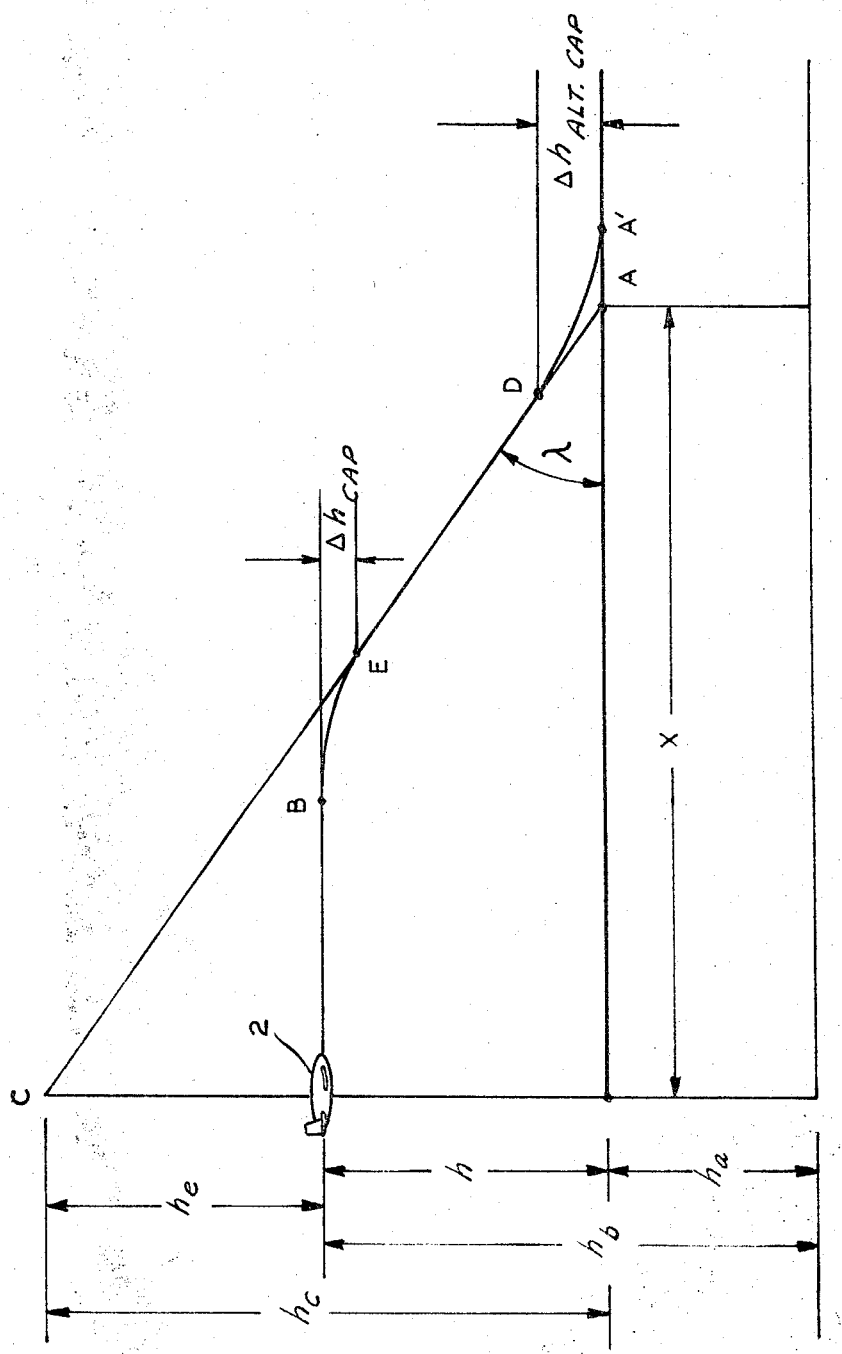
FIG. 1 is a diagrammatic representation of a flight path profile according to the present invention.

With reference to FIG. 1, an aircraft 2 flying at an actual altitude $h_b$ is a distance X from a preselected aimpoint A, and which aimpoint A is at an altitude $h_a$. The difference in altitude between aimpoint A and aircraft 2 is designated as $h = j_b - h_a$. The pilot desires to fly a $\lambda$ degree pitch angle from altitude $h_b$ to altitude $h_a$. Distance X multiplied by tangent $\lambda$ is defined as an altitude command $h_c$. As distance X decreases altitude command $h_c$ decreases proportionately to define a flight path CA for aircraft 2 to first capture and then follow to aimpoint altitude $h_a$. The difference between commanded altitude $h_c$ and actual altitude $h_b$ is an altitude error $h_e$.

The change in altitude required for aircraft 2 to capture flight path CA is defined as $\Delta h_{cap}$ and is expressed as follows:

$$K_1(h_o - h) + K_2(\dot{h}_o - \dot{h}) = \Delta h_{cap} \quad (1)$$

The altitude rate term $(\dot{h}_o - \dot{h})$ is added to insure that the flight path capture maneuver is started soon enough point B so that aircraft 2 does not overshoot flight path CA.

Aircraft 2 captures flight path CA at point E and then follows flight path CA to point D where a maneuver to capture aimpoint altitude $h_a$ is initiated. The change in altitude required to capture altitude $h_a$ defined as $\Delta h_{alt.\ cap}$ and is expressed as follows:

$$K_1 h + K_2 \dot{h} = \Delta h_{alt.\ cap} \quad (2)$$

When the altitude capture maneuver is completed point A' aircraft 2 is leveled at altitude $h_a$. $K_1$ and $K_2$ in equations 1 and 2 are gain factors, the significance of which will more fully be explained hereinafter.

Figure 2:
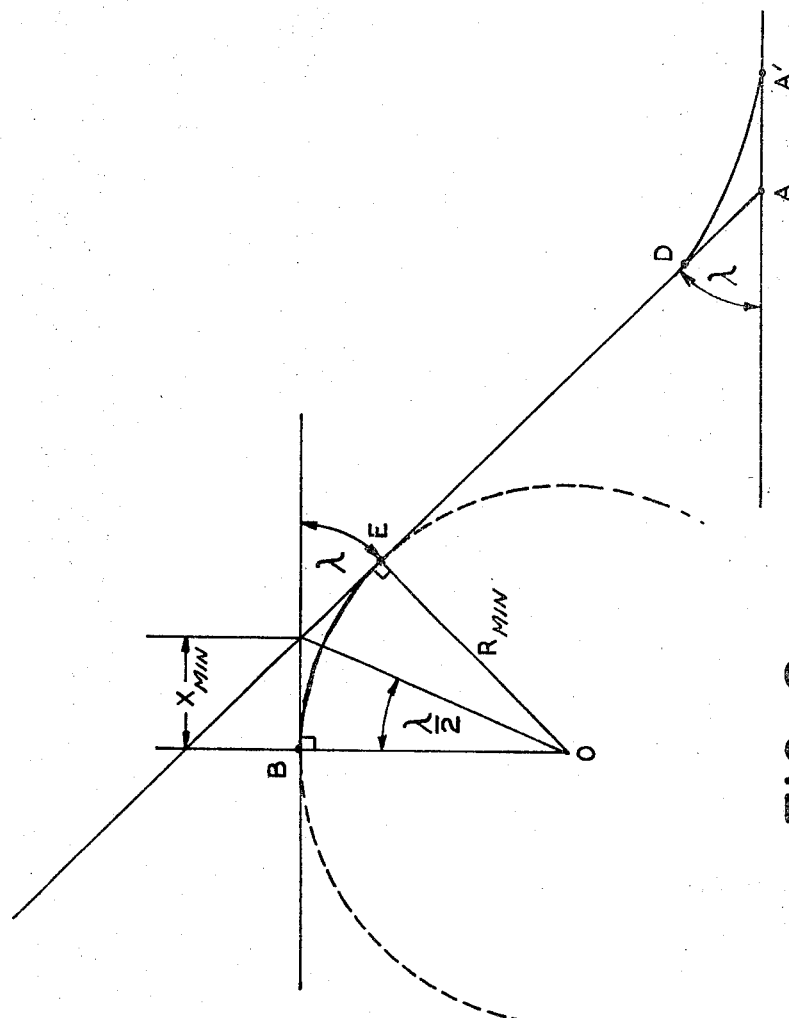
FIG. 2 is a diagrammatic representation showing the trigonometrical relationship between the flight path parameters shown in FIG. 1.

In order to explain how altitude rate error signal $\dot{h}_e$ anticipates flight path CA to prevent aircraft 2 from overshooting the flight path, a typical example has been selected. Aircraft 2 is flying at 611 feet per second ground speed $V_g$ at an altitude $h_b$ of 25,000 feet. The pilot desired to fly a 10° $\lambda$ flight path to an altitude $h_a$ of 20,000 feet with $-0.18g$ maximum acceleration $a_n$. For purposes of this analysis, aircraft 2 is initially at level flight point B and flies a path BE which is an arc of a circle to capture flight path CA at point E. As shown in FIG. 2, points B and E are points of tangency to arc BE. If aircraft 2 is considered a point mass, the minimum radius $R_{min}$ of arc BE is as follows:

$$R_{min} = V^2_g / a_{n_{max}} \quad (3)$$

The range, i.e. minimum horizontal distance $X_{min}$, to flight path CA is as follows:

$$X_{min} = R_{min} \tan \frac{\lambda}{2} \quad (4)$$

For the example selected, the minimum distance to flight path CA is 5513 feet as determined by appropriate substitutions in equations 3 and 4. The altitude error $h_e = h_c - h$ at this range is obtained from the relationships shown in FIG. 1 as follows:

$$h_o = (h_o - h) = 5513 \tan 10° = 972 \text{ feet} \quad (5)$$

The altitude rate command $(\dot{h}_c)$ at ground speed of 611 feet per second is as follows:

$$\dot{h}_o = V_g \tan(-10°) = -108 \text{ ft./sec.} \quad (6)$$

Since aircraft 2 starts the flight path capture maneuver from level flight, the actual altitude rate ($\dot{h}$) of the craft is substantially zero. Therefore, the altitude rate error $\dot{h}_e$ is as follows:

$$\dot{h}_e = \dot{h}_o - \dot{h} = -108 \text{ ft./sec.} - 0 = -108 \text{ ft./sec.} \quad (7)$$

If gain $K_1$ is unity and gain $K_2$ is, for purposes of illustration, nine times that of gain $K_1$, appropriate substitution in equation 1 shows that $\Delta h$ is zero and the flight path capture maneuver is initiated point B in FIGS. 1 and 2 when X = 5513 feet. The numerical solution to the above problem is as follows:

$$h = h_b - h_a = 5,000 \text{ feet}$$
$$K_1 = 1.0 \qquad K_2 = 9.0$$
$$\Delta h_{cap} = K_1(h_o - h) + K_2(\dot{h}_o - \dot{h})$$
$$X \tan \lambda = 972$$
$$X = 5513 \text{ feet}$$

It is seen from the aforegoing example that as the ratio $K_1$ to $K_2$ increases, point B $\Delta h_{cap} = 0$ occurs closer to flight path CA and as the ratio decreases point B occurs further away from flight path CA.

Figure 3:
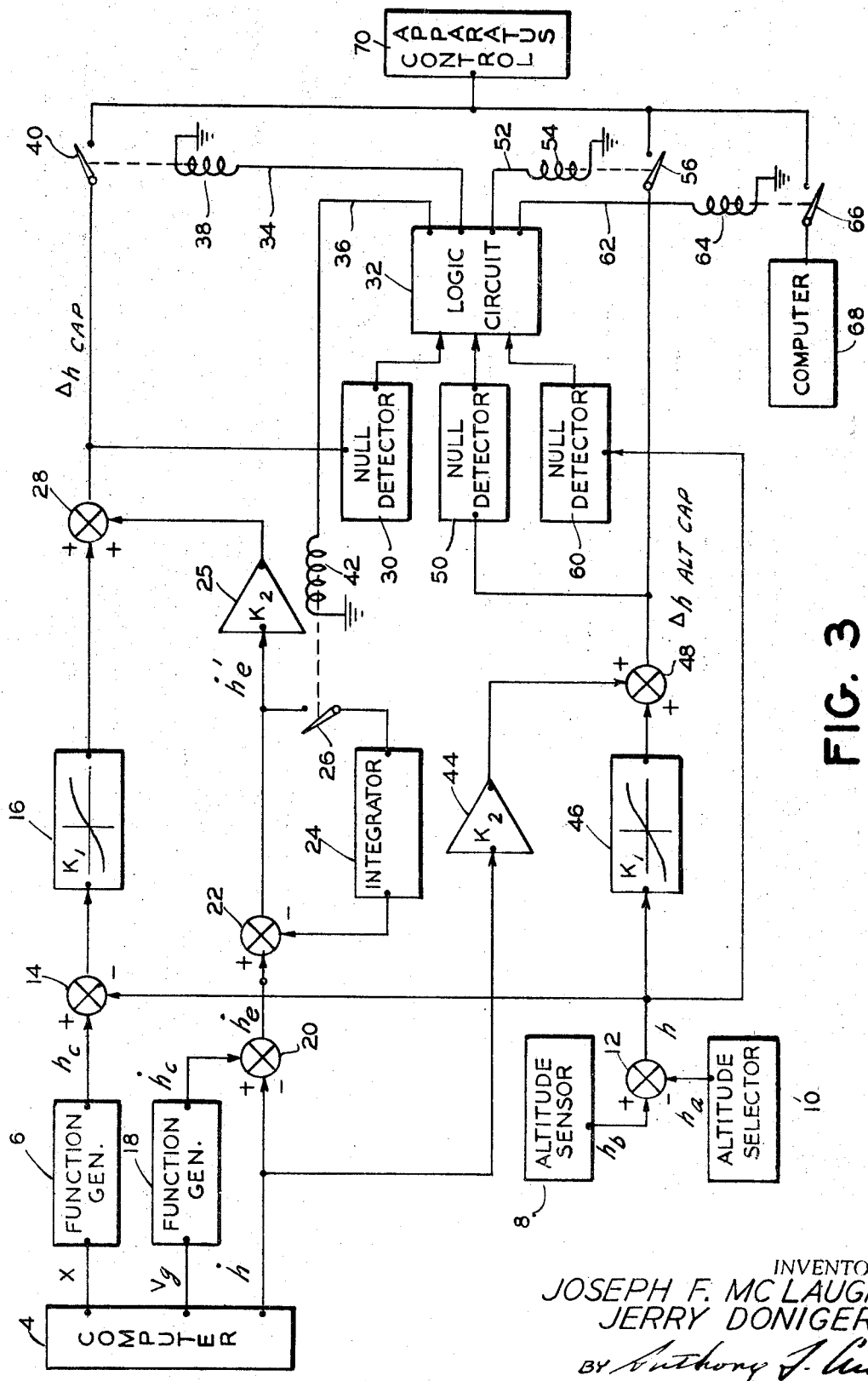
FIG. 3 is a block diagram showing a system for controlling the vertical flight of an aircraft according to the invention.

With reference to FIG. 3, an onboard device such as a flight data computer 4 provides a signal corresponding to distance X of aircraft 2 from predetermined aimpoint A, a signal corresponding to ground speed $V_g$ of aircraft 2 and a signal corresponding to altitude rate $\dot{h}$ of the craft. Distance signal X is applied to a function generator 6 which multiplies the signal by the tangent of a pilot selected angle $\lambda$ for providing a signal corresponding to altitude command $h_c$.

An altitude sensor 8 provides a signal corresponding to corrected barometric altitude $h_b$ of aircraft 2 and an altitude selector 10 provides a signal corresponding to pilot selected altitude $h_a$ of aimpoint A. Aircraft altitude signal $h_b$ and aimpoint altitude signal $h_a$ are applied to a summation means 12 which algebraically sums the signals and provides a signal corresponding to altitude $h$ of aircraft 2 above aimpoint A. Signal $h$ from summation means 12 and signal $h_c$ from function generator 6 are applied to a summation means 14 which sums the signals and provides a summation signal which is applied to a gain device 16 having a nonlinear varying gain $K_1$.

Ground speed signal $V_g$ from computer 4 is applied to a function generator 18 which provides a signal corresponding to commanded altitude rate $\dot{h}_o$. Commanded altitude rate signal $\dot{h}_o$ is applied to a summation means 20 and algebraically summed thereby with altitude rate signal $\dot{h}$ from computer 4 for providing an altitude rate error signal $\dot{h}_e$. Signal $\dot{h}_e$ is applied to a summation means 22 and summed thereby with output of an integrator 24 connected in feedback configuration, and through a normally open switch 26, to summation means 22.

Signal $\dot{h}_{e'}$ from summation means 22 is applied to an amplifier 25 having a constant gain $K_2$. The signal from gain device 16 and the signal from amplifier 25 are applied to a summation means 28 which adds the signals and provides a signal corresponding to the change in altitude $\Delta h_{cap}$ required for aircraft 2 to capture flight path CA as heretofore described with reference to FIGS. 1 and 2. A null detector 30 has an input connected to summation means 28 and an output connected to an input of a logic circuit 32. When signal $\Delta h_{cap}$ is zero, null detector 30 provides, after a predetermined interval, an output for rendering logic circuit 32 effective to provide at a conductor 36 in an output for energizing a relay 42, and which energized relay 42 closes switch 26 thereby rendering the integrator 24 effective to integrate the output of summation means 22 for purposes to be hereinafter explained. The output from null detector 30 renders logic circuit 32 effective for providing at a conductor 34 an output for energizing a relay 38, and which energized relay 38 closes a normally open switch 40 to connect summation means 28 to control apparatus 70, and which control apparatus 70 may be an autopilot or flight director system responsive to signal $\Delta h_{cap}$ for controlling aircraft 2 to first capture flight path CA $\Delta h_{cap} = 0$ and thereafter to follow flight path CA to point D shown in FIGS. 1 and 2.

Altitude rate signal $\dot{h}$ from computer 4 is connected to an amplifier 44 having a constant gain $K_2$. Altitude signal $h$ from summation means 12 is applied to a gain device 46 having a nonlinear varying gain $K_1$. The signal from gain device 44 and the signal from gain device 46 are applied to a summation means 48 which adds the signals and provides a signal corresponding to the change in altitude $\Delta h_{alt.\ cap}$ required for aircraft 2 to capture aimpoint altitude $h_a$. A null detector 50 has an input connected to summation means 48 and an output connected to logic circuit 32. When signal $\Delta h_{alt.\ cap}$ is zero, null detector 50 provides an output which renders logic circuit 32 effective to provide at the conductors 34 and 36 an output for deenergizing relays 38 and 42, and which deenergized relays open switches 40 and 26, respectively. The signal from null detector 50 renders logic circuit 32 effective for providing at a conductor 52 an output for energizing a relay 54, and which energized relay 54 closes a normally open switch 56 thereby connecting summation means 48 to control apparatus 70. Control apparatus 70 is responsive to signal $\Delta h_{alt.\ cap}$ for controlling aircraft 2 to first capture aimpoint altitude $h_a$ $\Delta h_{alt.\ cap} = 0$ and then to level at altitude $h_a$.

A null detector 60 has an input connected to summation means 12 and an output connected to logic circuit 32. When altitude signal $h$ from summation means 12 is zero, i.e. aircraft 2 has captured aimpoint altitude $h_a$, logic circuit 32 provides at output conductors 34 and 36 outputs for maintaining relays 38 and 42 deenergized. Logic circuit 32 provides at a conductor 52 an output for deenergizing relay 54, and which deenergized relay opens switch 56, and provides at an output conductor 62 an output for energizing a relay 64, and which energized relay 64 closes a switch 66 thereby connecting an air data computer 68 to control apparatus 70 and whereby there may be provided an altitude hold mode to control device 70.

OPERATION

The device of the present invention receives signal X corresponding to the distance of aircraft 2 from predetermined aimpoint A. Signal X is multiplied by the tangent of pilot selected flight path angle $\lambda$ to provide altitude command signal $h_c$. As signal X decreases, altitude command signal $h_c$ decreases proportionately describing flight path CA.

Altitude command signal $h_c$ and signal $h$ corresponding to the altitude of aircraft 2 above aimpoint A are summed and the summed signal is added to rate error signal $\dot{h}_e$ to anticipate the approach of aircraft 2 to flight path CA and to initiate the flight path capture maneuver soon enough so that aircraft 2 will not overshoot flight path CA. The flight path capture maneuver is initiated when signal $\Delta h_{cap}$ is zero and thereafter signal $\Delta h_{cap}$ is a control signal for controlling aircraft 2 to follow flight path CA. In this connection it is to be noted that the ratio $K_1$ to $K_2$ will have the effect of shifting the zero point of signal $\Delta h_{cap}$ closer to flight path CA point B in FIGS. 1 and 2 as the ratio increases and further away from flight path CA as the ratio decreases. If $K_1$ is unity and $\Delta h_{cap}$ signal is transmitted as an altitude error signal, the altitude loop gain will be the same as when control apparatus 70 is on normal altitude hold mode. Altitude rate error signal $\dot{h}_e$ which was added to anticipates the flight path capture maneuver also over damps the altitude response of aircraft 2 tending to prevent the craft from overshooting flight path CA.

As ground speed $V_g$ and the pilot selected angle $\lambda$ increase, the peak normal acceleration of aircraft 2 increases so that the maximum acceleration limit placed on the flight path capture maneuver is exceeded. To reduce this acceleration, gain $K_1$ may be reduced for larger signal amplitudes. Since $K_1$ is nonlinear, the zero point of signal $\Delta h_{cap}$ is shifted away from flight path CA as ground speed $V_g$ and flight path angle $\lambda$ increase, but the altitude displacement gain up to an altitude error of about 500 feet is not affected. Gain $K_2$ may also be increased to shift the zero point of signal $\Delta h_{cap}$. However, increasing gain $K_2$ provides unacceptably high signal noise levels and over damps the system which is already quite over damped. Simply lowering gain $K_1$ will shift the flight path capture point in the desired direction but will also lower the altitude loop gain degrading aircraft performance. Thus, it is important that gain $K_1$ changes gradually. If the change in gain is fast in comparison to the response of aircraft 2, a multiple maneuver will be experienced.

Another important consideration is that after the initial flight path capture maneuver has been essentially completed, altitude rate error signal $h_e$ is applied to integrator 24. Integrator 24 is switched into the control loop by the output of null detector 30 after the predetermined time interval has elapsed. While this interval varies for different aircraft and for different maximum acceleration specifications, the filter transfer function may be expressed as follows:

$$\frac{\dot{h}_c{}'}{\dot{h}_c} = \frac{s}{s+k}$$

R where $\dot{h}_c{}'$ is the output of summation means 22. Integrator 24 is necessary in order to account for any tracking error discrepancy caused by the difference between altitude rate command signal $\dot{h}_c$ which is a function of computed groundspeed $V_g$ and altitude rate signal $\dot{h}$ of aircraft 2 provided independent of groundspeed.

Simultaneously, as the flight path capture maneuver is being computed and executed, the altitude capture computation is being performed. As altitude capture signal $\Delta h_{alt.~cap}$ passes through zero, the maneuver is initiated and thereafter the signal is a control signal for leveling out the aircraft at aim-point altitude $h_a$.

When altitude signal $h$ reaches zero, the vertical flight path maneuver is completed. Null detector 60 senses the zero point of altitude signal $h$ and actuates logic circuit 32 to revert control system 70 to an appropriate mode.

Although but a single embodiment of the invention has been illustrated and described in detail, it is to be expressly understood that the invention is not limited thereto. For example, although the invention has been described with reference to controlling an aircraft to fly from a higher altitude to a lower altitude it can equally as well control the craft to fly from a lower altitude to a higher altitude.

We claim:

1. A system for controlling an aircraft to follow a flight path from its present altitude to a predetermined aimpoint altitude, comprising:
   means for providing a signal corresponding to the distance of the craft from the aimpoint;
   means for providing a signal corresponding to the speed of the craft;
   means for providing a signal corresponding to the altitude of the craft;
   means for providing a signal corresponding to the altitude rate of the craft;
   means for providing a signal corresponding to the aimpoint altitude;
   means for providing a signal corresponding to the difference between the predetermined aimpoint altitude and the aircraft altitude;
   means responsive to the distance signal for providing an altitude command signal as a function of the flight path angle;
   means responsive to the aircraft speed signal for providing an altitude rate command signal;
   means for summing the altitude command signal and the difference signal;
   means for summing the altitude rate signal and the altitude rate command signal;
   means responsive to the summation signals for providing a flight path capture signal; and
   control means responsive to the flight path capture signal for controlling the craft to first capture and then track the predetermined flight path.

2. A system as described by claim 1 including means for connecting the flight path capture signal means to the control means, said connecting means comprising:
   a normally open switch connected intermediate the flight path capture signal means and the control means;
   a null detector connected to the flight path capture signal means for providing a signal when the signal from said means is substantially zero; and
   switch actuating means connected to the null detector and responsive to the signal therefrom for closing the switch.

3. A system as described by claim 2 including:
   summing means connected to the means for summing the altitude rate signal and the altitude rate command signal;
   an integrator connected as its output to the input of the summing means;
   a normally open switch for connecting the input of the integrator to the output of the summing means; and
   the switch actuating means being responsive to the signal from the null detector for closing the switch so that the integrator provides a signal to compensate for long term tracking errors.

4. A system as described by claim 1 including:
   first gain adjusting means connected to the means for summing the altitude command signal and the difference signal for providing a first gain adjusted signal in response to the signal therefrom;
   second gain adjusting means connected to the means for summing the altitude rate signal and the altitude rate command signal for providing a second gain adjusted signal in response to the signal therefrom;
   third gain adjusting means connected to the means for providing a signal corresponding to the difference between the predetermined aimpoint altitude and the aircraft altitude for providing a third gain adjusted signal in response to the signal therefrom;
   fourth gain adjusting means connected to the means for providing a signal corresponding to the altitude rate of the craft for providing a fourth gain adjusted signal; and
   the ratio of said first and second gain adjusted signals corresponding to the ratio of said third and fourth gain adjusted signals.

5. A system as described by claim 4, wherein:
   the first and third gain adjusting means provide a nonlinearly varying gain adjustment; and
   the first and fourth gain adjusting means have a constant gain.

6. A system for controlling an aircraft to follow a programmed flight path from its present altitude to a predetermined altitude over an aimpoint, comprising:
   means for providing an altitude command signal as a function of the distance of the aircraft from the aimpoint;
   means for providing an altitude rate command signal as a function of the speed of the craft;
   means for providing a signal corresponding to the actual altitude rate of the craft;
   means for providing an altitude rate error signal in response to the altitude rate command signal and the actual altitude rate signal;
   means for providing a signal corresponding to the altitude of the craft above the aimpoint; and
   means for controlling the aircraft in response to the altitude command signal, the altitude rate error signal and the signal corresponding to the altitude of the craft above the aimpoint for capturing and tracking the flight path, and for controlling the craft in response to the altitude rate signal and the signal corresponding to the altitude of the craft above the aimpoint for capturing the predetermined altitude and leveling at said altitude.